United States Patent
Hwang et al.

(10) Patent No.: US 6,841,509 B1
(45) Date of Patent: Jan. 11, 2005

(54) CARBON NANOCAPSULE SUPPORTED CATALYSTS

(75) Inventors: Gan-Lin Hwang, Tainan (TW); Chao-Kang Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/716,630

(22) Filed: Nov. 20, 2003

(30) Foreign Application Priority Data

Jul. 21, 2003 (TW) ........................... 92119776 A

(51) Int. Cl.⁷ .................. B01J 21/18; B32B 18/00; B32B 15/02; D01F 9/12
(52) U.S. Cl. .................. 502/180; 502/181; 502/182; 502/183; 502/184; 502/185; 428/325; 428/328; 428/402.2; 428/402.24; 428/428; 428/457; 428/698; 423/447.5; 423/445 RB
(58) Field of Search .................. 502/180–185; 428/408, 325, 328, 457, 698, 402.2, 402.24; 423/447.5, 445 R

(56) References Cited

U.S. PATENT DOCUMENTS

| | | | | |
|---|---|---|---|---|
| 5,456,986 A | * | 10/1995 | Majetich et al. | 428/403 |
| 5,543,378 A | * | 8/1996 | Wang | 502/174 |
| 5,547,748 A | * | 8/1996 | Ruoff et al. | 428/323 |
| 2004/0126303 A1 | * | 7/2004 | Hwang | 423/447.2 |

* cited by examiner

*Primary Examiner*—Mark L. Bell
*Assistant Examiner*—Patricia L. Hailey
(74) *Attorney, Agent, or Firm*—Birch, Stewart, Kolasch & Birch, LLP

(57) ABSTRACT

A carbon nanocapsule supported catalysts. At least one kind of catalytic metal particle is deposited to a carbon nanocapsule, wherein the carbon nanocapsule has the following formula: F(-M)n, in which F is the carbon nanocapsule, M is the catalytic metal particle, and n is the number of the catalytic metal particle. By applying the carbon nanocapsule as a catalyst support, the catalytic behavior of the catalytic metal particle is specialized, the dispersion is improved, and the catalytic effect is enhanced.

22 Claims, 3 Drawing Sheets

CARBON NANOCAPSULE SUPPORTED CATALYSTS

This Nonprovisional application claims priority under 35 U.S.C. § 119(a) on patent application Ser. No(s). 09/2,119, 776 filed in TAIWAN on Jul. 21, 2003, the entire contents of which are hereby incorporated by reference.

BACKGROUND OF THE INVENTION

1. Field of the Invention

The present invention relates to carbon nanocapsules, and more particularly to a carbon nanocapsule supported catalysts.

2. Description of the Related Art

A carbon nanocapsule is a polyhedral carbon cluster constituted by having concentric multi-layers of closed graphitic sheet structure. The diameter of a carbon nanocapsule is about 3–100 nm. There are two types of carbon nanocapsules: hollow and metal-filled. The center of a hollow carbon nanocapsule is leaving a nanoscale cavity, while that of a metal-filled nanocapsule is filled with metals, metal oxides, metal carbides, or alloys.

Carbon nanocapsules were first discovered with carbon nanotubes in 1991, in the process of producing carbon nanotubes. Due to the strong van der Waals force between carbon nanocapsules and carbon nanotubes, carbon nanocapsules are not easily isolated from the carbon nanotubes. In addition, the amount of carbon nanocapsules produced with carbon nanotubes is sufficient only for structural observation under an electron microscope, thus the application thereof is limited.

With continuous research, processes producing high-purity hollow carbon nanocapsules as well as magnetic metal-filled carbon nanocapsules have been developed. (Please refer to U.S. patent application Ser. No. 10/255,669 and 10/329,333) With their special hyperfullerene structure and optoelectronic properties, polyhedral carbon nanocapsules is brought about by well-developed graphitic structure, with high impact strength, electric and heat conduction and surface area, are suitable for use as catalyst supports.

Materials including aluminum oxide, Zeolite, silicon oxide, magnesium oxide, carbon black and carbon nanotubes are generally used as supports for catalytic metal particles. With different supports, metal particles may have different catalytic properties. Therefore, serious consideration must be given to the objects of catalysis, the catalytic environmental conditions, and compatibility between catalysts and supports when selecting a suitable support.

Carbon materials such as carbon black and carbon nanotubes have been used as supports for catalytic metal particles, and various studies regarding their catalytic effects have been performed. Studies regarding the use of a carbon nanocapsule as a catalyst support, however, are lacking.

SUMMARY OF THE INVENTION

Accordingly, an object of the present invention is to provide a carbon nanocapsule supported catalysts thereby furthering development of its applications in catalyst technology. By integrating the aforementioned methods of manufacturing purified carbon nanocapsules, a carbon nanocapsule supported catalysts is provided.

Therefore, the invention provides a carbon nanocapsule supported catalysts, comprising at least one kind of catalytic metal particle deposited on the carbon nanocapsule, wherein the carbon nanocapsule has the following formula: $F(-M)n$, in which F is the carbon nanocapsule, M is the catalytic metal particle, and n is the number of catalytic metal particles.

The carbon nanocapsule of the invention is closed polyhedral morphology of graphitic particles, made up of multiple graphite layers, which are flat except at the corner and edges of the polyhedra. The diameter of a carbon nanocapsule is about 3–100 nm.

The carbon nanocapsule of the invention can be a hollow carbon nanocapsule or a metal-filled carbon nanocapsule filled with metals, metal oxides, metal carbides, or alloys. The metal-filled carbon nanocapsule is preferably filled with magnetic metal, magnetic metal oxides, magnetic metal carbides or magnetic metal alloys. The magnetic metal are, for example, Sc, V, Cr, Fe, Co, Ni, Y, Zr, Mo, Ru, Rh, Pd, La, Ce, Pr, Nd, Gd, Tb, Dy, Ho, Er, Tm, Lu, Ta, Os, Ir, Pt, Au, Th, U or combinations thereof.

According to the invention, the catalytic metal particle can be a nanocluster, substantially constituting metal atoms, able to catalyze chemical reactions. The catalytic metal particle can be a nanocluster constituting metals, metal oxides, metal carbides, metal nitrides, alloys, or combinations thereof. For example, the catalytic metal particle is a nanocluster constituting Pt, Pd, Rh, Cu, Fe, Co, Ni, Au, Ru, Zn, Ti, Os, Mo, or Ag. The catalytic metal particle can also be an organic metal particle, for example, $PtCl_2(NH_2)_2$ and ferrocene.

The corners appearing on the outermost graphite layer of a carbon nanocapsule are easily to modify with functional groups for the attachment of metal catalytic metal particles. Therefore, according to the invention, the catalytic metal particle is mostly deposited at a corner of the outermost graphite layer of the polyhedral carbon nanocapsule.

According to the invention, the diameter of the catalytic metal particle is preferably 1–20 nm, and the number of the catalytic metal particles is preferably 1–20.

Different from other carbon catalyst supports such as carbon black and carbon nanotubes, the highly-graphitized polyhedral carbon nanocapsule offered pentagons structure at the corners of the graphite layers. The carbon atoms positioned at the corners are more active than others and forming an electron donor site. Thus, using a carbon nanocapsule as a catalyst support makes use of the catalytic effects of a catalyst. Additionally, using a magnetic metal-filled carbon nanocapsule catalyst support provides a local stable magnetic field very close to the catalytic metal particles bonded thereon, thereby enhancing catalysis. Therefore, with their high impact strength, high electric and heat conductivity, and high surface area, carbon nanocapsules, capable of stabilizing catalytic metal particles, are suitable for use as a catalyst support of catalytic metal particles.

Owing to the unique features of carbon nanocapsules, which are different from other catalyst supports, carbon nanocapsules are suitable for use in various applications including fuel cells, petrochemical industry, and spin-exchange reactions in organic synthesis, bio-catalysts, and light-emitting materials.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
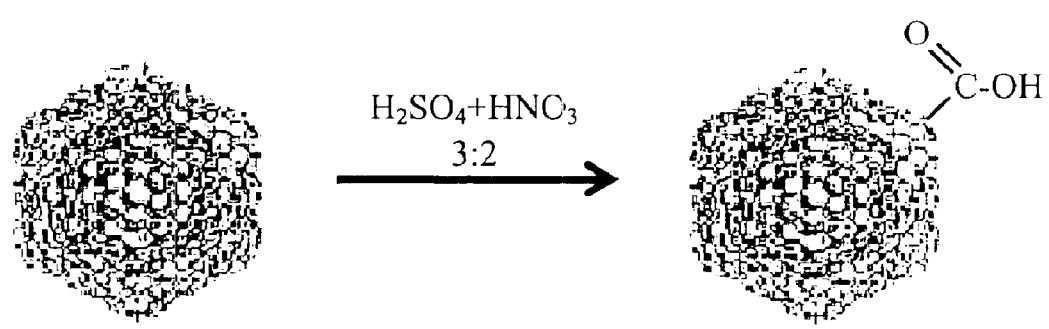
FIG. 1 illustrates the functionalization of a carbon nanocapsule in the embodiment.

Before preparing carbon nanocapsules as catalyst support, high-purity carbon nanocapsules must be prepared first, by the preparation method described, in the above-mentioned references. The obtained high-purity carbon nanocapsules are then functionalized by, for example, a redox reaction, cycloaddition reaction, or a radical addition reaction to substitute a part of the carbon atoms on the surface of the carbon nanocapsules by functional groups, such that they are able to disperse uniformly in a solution. The functional groups are, for example, —OH, —C=O, —CHO, —COOH, —NHAr, —N$^+$(CH$_3$)$_2$Ar, =CCl$_2$, —OSO$_3$, —C(CH$_3$)$_2$COOCH$_3$ or —C(CH$_3$)$_2$CN.

The functionalized carbon nanocapsules were then subject to a chemical reaction to substitute the functional groups by catalytic metal particles. For example, functionalized carbon nanocapsules are first dissolved uniformly in a solution, and a compound including catalytic groups is added therein. The solution is, for example, ethylene glycol, ethanol, water or tetrahydrofuran (THF). The duration of the reaction is about 4–6 hours. The reaction temperature is preferably the refluxing temperature, i.e. the boiling point of the solution. The compound is easily dissolved in the solution to release the catalytic groups and other non-catalytic groups. With stronger affinity to the non-catalytic groups than the carbon nanocapsules, the functional groups tend to form a more stable compound with the non-catalytic groups. Meanwhile, the catalytic groups substitute the functional groups to form bonds with the carbon nanocapsules, and the carbon nanocapsules thereby serve as a catalyst support.

The provided catalyst support has the following features. From a structural perspective, carbon nanocapsules are polyhedral carbon clusters with each carbon atom having an sp$^2$-electron configuration. Carbon atoms at the flat part of the graphite layers are a hexagonal network (six-member ring) structure while those at the corners of the graphite shells are of pentagon (five-member ring) structure. Other carbon materials such as carbon black and carbon nanotubes substantially offer hexagonal structures for catalyst-support while polyhedral carbon nanocapsules offer many pentagonal structures at the corners for catalyst-supporting. Therefore, by using appropriate oxidants, functional groups can be selectively modified at the corners, and then catalytic metal particles can attach to those functional groups.

In addition, while using a magnetic-metal-filled carbon nanocapsule as catalyst support, the localized magnetic field provided by the carbon nanocapsule can help catalyze specific reactions, for example, the spin-exchange reaction. On the contrary, conventional catalyst supports provide no magnetism; an external magnetic field is, therefore, required for some magnetically-catalyzed reactions unless magnetic metal particles are used directly as catalyst support. Furthermore, carbon nanocapsules filled with radioactive elements such as Co-60 or lanthanide series may also have special catalytic effects for catalyst support.

Furthermore, using a magnetic-metal-filled carbon-nanocapsule as catalyst support facilitates the separation of catalysts from products after complete reaction by simply applying magnetism, the catalysts are thereby recycled, the costs are lowered, and the difficulty of separating organic metal catalysts is solved.

In addition, carbon nanocapsules can be easily dispersed in solutions; catalytic metal particles can, therefore, uniformly disperse on the carbon nanocapsules, and the uniformly dispersed catalytic metal particles catalyze better during a reaction.

Therefore, in addition to the unique features of carbon nanocapsules which are different from other catalyst supports, carbon nanocapsules further improve the catalyzing capability of catalysts by their excellent dispersion ability.

Embodiment

In the embodiment, hollow carbon nanocapsules and Tb-filled carbon nanocapsules were prepared as catalyst support for Pt particles.

As in FIG. 1, hollow carbon nanocapsules were first functionalized.

A reaction flask (1L) was charged with hollow carbon nanocapsules (10 g) dissolved in 500 ml sulfuric acid/nitric acid (volume ratio=1:1). The mixture was stirred by an ultrasonic cleaner for 10 mins, and then heated to about 140° C. and refluxed for 2 hours. Afterwards, the mixture was centrifuged to separate the carbon nanocapsules from the strong acid, rinsing the carbon nanocapsules thoroughly followed by several centrifuges, until the pH value of carbon nanocapsules approached 7. The carbon nanocapsules obtained were black with —COOH groups bonded thereon. By titration using NaOH, the concentration of the —COOH groups was identified as 13 μmols/per gram carbon nanocapsules.

Figure 2:
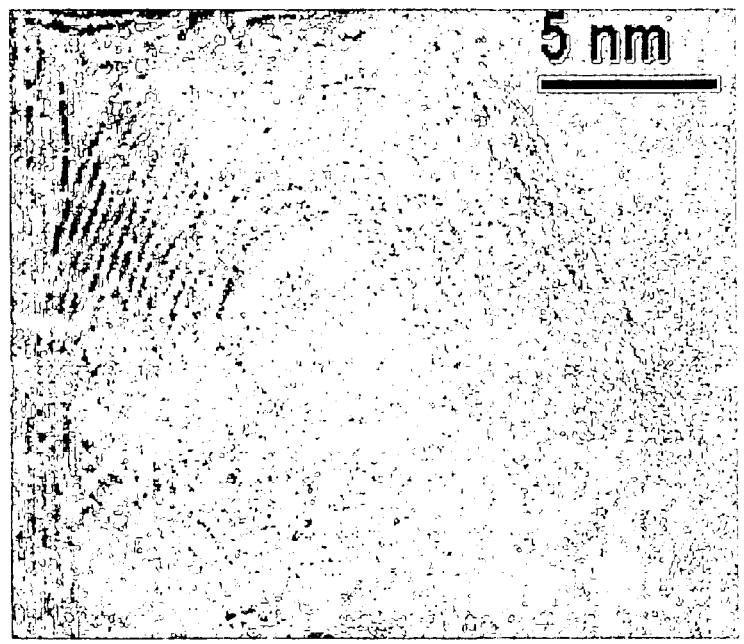
FIG. 2 shows the surface-oxidized carbon nanocapsule in the embodiment by TEM observation.

FIG. 2 shows the carboxyl-group-functionalized carbon nanocapsule by TEM observation. It is shown that the oxidant selectively oxidized the corners of the outer graphite layer, and the carboxyl groups were thereby bonded at the corners.

A reaction flask was charged with 200 mg of the obtained carboxyl-group-functionalized carbon nanocapsule and 200 ml ethylene glycol. The mixture was stirred by an ultrasonic cleaner for 10 minutes, and then 10 mg of platinum chloride (PtCl$_4$) was added. After mixing and stirring, the mixture was heated to about 140° C. and refluxed for 6 hours. Afterwards, the mixture was centrifuged to separate the carbon nanocapsules from ethylene glycol.

Figure 3:
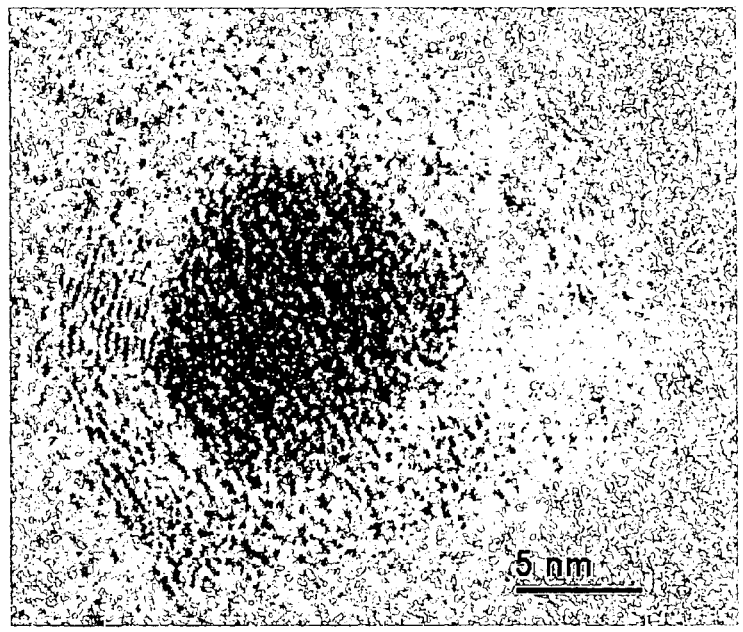
FIG. 3 shows the carbon nanocapsule catalyst support in the embodiment by TEM observation.

FIG. 3 shows the Pt-supporting carbon nanocapsule by TEM observation. As shown in FIG. 3, Pt particles with a diameter around 3 nm were uniformly deposited on the carbon nanocapsule.

Except substituting the hollow carbon nanocapsules by Tb-filled carbon nanocapsules, metal-filled carbon nanocapsules for catalyst supporting were again prepared according to the above describe steps. The prepared Tb-filled, surface-oxidized carbon nanocapsule was shown in FIG. 4 while the Tb-filled carbon nanocapsule catalyst support was shown in FIG. 5 by TEM observation.

Figure 4:
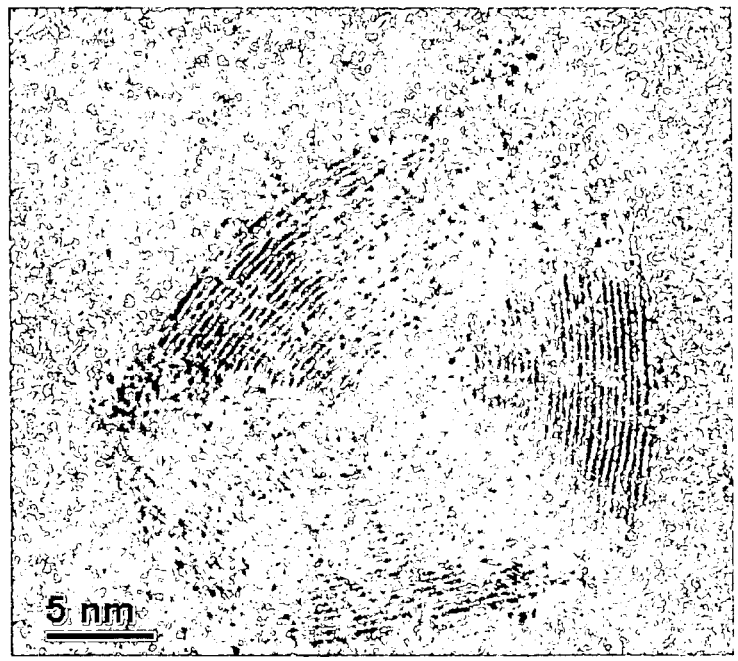
FIG. 4 shows the magnetic metal-filled, carboxyl group-functionalized carbon nanocapsule in the embodiment by TEM observation.

FIG. 2 and FIG. 4 respectively show the hollow and Tb-filled carbon nanocapsules by TEM observation. It is shown that the oxidants selectively oxidized the corners of the outer graphite layer, and the carboxyl groups were thereby bonded at the corners.

Figure 5:
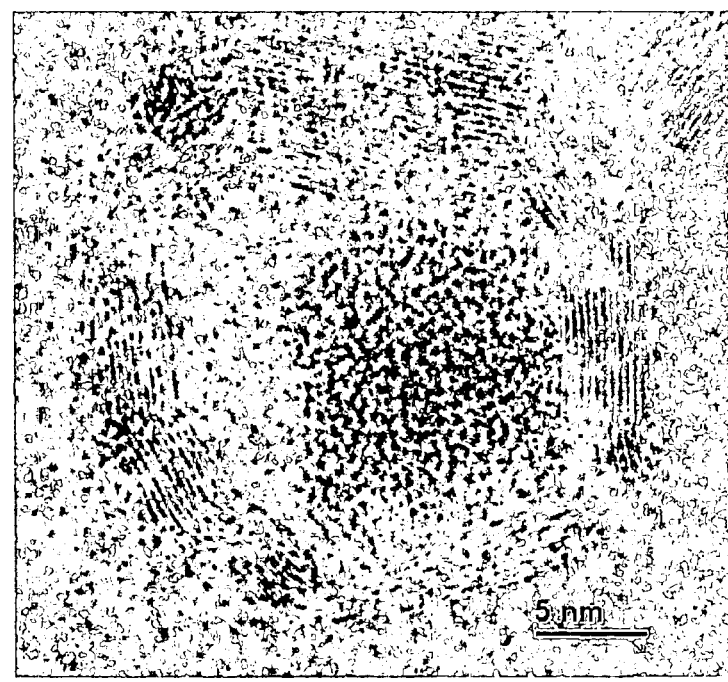
FIG. 5 shows the magnetic metal-filled carbon nanocapsule as catalyst support in the embodiment by TEM observation.

FIG. 3 and FIG. 5 respectively show the Pt-supporting carbon nanocapsules by TEM observation. It is shown that Pt particles were uniformly deposited on the carbon nanocapsules.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A carbon nanocapsule supported catalyst, comprising at least one kind of catalytic metal particle deposited on the carbon nanocapsule, wherein the carbon nanocapsule has the following formula: F(–M)n, in which F is the carbon nanocapsule, N is the catalytic metal particle, and n is the number of the catalytic metal particle.

2. The carbon nanocapsule supported catalyst as claimed in claim 1, wherein the carbon nanocapsule is a polyhedral carbon cluster constituted by having a concentric multi-layers of closed graphitic sheet structure, and the diameter of the carbon nanocapsule is 3–100 nm.

3. The carbon nanocapsule supported catalyst as claimed in claim 1, wherein the carbon nanocapsule is hollow.

4. The carbon nanocapsule supported catalyst as claimed in claim 1, wherein the carbon nanocapsule is a metal-filled carbon nanocapsule filled with metals, metal oxides, metal carbides, or alloys.

5. The carbon nanocapsule supported catalyst as claimed in claim 1, wherein n is 1–20.

6. The carbon nanocapsule supported catalyst as claimed in claim 1, wherein the catalytic metal particle is a nanocluster, substantially constituting metal atoms, able to catalyze chemical reactions.

7. The carbon nanocapsule supported catalyst as claimed in claim 6, wherein the catalytic metal particle is a nanocluster constituting metals, metal oxides, metal carbides, metal nitrides, metal sulfides, alloys or combinations thereof.

8. The carbon nanocapsule supported catalyst as claimed in claim 7, wherein the catalytic metal particle is a nanocluster constituting Pt, Pd, Rh, Cu, Fe, Co, Ni, Au, Ru, Zn, Ti, Os, Mo, or Ag.

9. The carbon nanocapsule supported catalyst as claimed in claim 1, wherein the catalytic metal particle is an organic metal particle.

10. The carbon nanocapsule supported catalyst as claimed in claim 9, wherein the catalytic metal particle is $PtCl_2(NH_2)_2$ or ferrocene.

11. The carbon nanocapsule supported catalyst as claimed in claim 1, wherein the catalytic metal particle M is deposited at a corner of the outermost graphite layer of the polyhedral carbon nanocapsules.

12. The carbon nanocapsule supported catalyst as claimed in claim 11, wherein the catalytic metal particle M is attach to those functional groups which were selective modified at the corners.

13. The carbon nanocapsule supported catalyst as claimed in claim 1, wherein the diameter of the catalytic metal particle is 1–20 nm.

14. A carbon nanocapsule supported catalyst, comprising at least one kind of catalytic metal particle, with a diameter of 1–20 nm, deposited at a corner of the outermost graphite layer of the carbon nanocapsule, wherein the carbon nanocapsule has the following formula: F(–M)n, in which F is the carbon nanocapsule, M is the catalytic metal particle, and n, the number of the catalytic metal particle, is 1–20.

15. The carbon nanocapsule supported catalyst as claimed in claim 14, wherein the carbon nanocapsule is a polyhedral carbon cluster constituted by having concentric multi-layers of closed graphitic sheet structure, and the diameter of the carbon nanocapsule is about 3–100 nm.

16. The carbon nanocapsule supported catalyst as claimed in claim 14, wherein the carbon nanocapsule is hollow.

17. The carbon nanocapsule supported catalyst as claimed in claim 14, wherein the carbon nanocapsule is a metal-filled carbon nanocapsule filled with metals, metal oxides, metal carbides, or alloys.

18. The carbon nanocapsule supported catalyst as claimed in claim 14, wherein the catalytic metal particle is a nanocluster, substantially constituting metal atoms, able to catalyze chemical reactions.

19. The carbon nanocapsule supported catalyst as claimed in claim 18, wherein the catalytic metal particle is a nanocluster constituting metals, metal oxides, metal carbides, metal nitrides, metal sulfides, alloys or combinations thereof.

20. The carbon nanocapsule supported catalyst as claimed in claim 19, wherein the catalytic metal particle is a nanocluster constituting Pt, Pd, Rh, Cu, Fe, Co, Ni, Au, Ru, Zn, Ti, Os, Mo, or Ag.

21. The carbon nanocapsule supported catalyst as claimed in claim 14, wherein the catalytic metal particle is an organic metal particle.

22. The carbon nanocapsule supported catalyst as claimed in claim 21, wherein the catalytic metal particle is $PtCl_2(NH_2)_2$ or ferrocene.

* * * * *